April 3, 1951     D. S. WILLSON     2,547,741
REGISTER LOCKING MEANS

Filed Sept. 23, 1946     3 Sheets-Sheet 1

INVENTOR.
David S. Willson,
BY
Attorney.

April 3, 1951  D. S. WILLSON  2,547,741
REGISTER LOCKING MEANS
Filed Sept. 23, 1946  3 Sheets-Sheet 2

INVENTOR.
David S. Willson,
BY
Attorney.

April 3, 1951 D. S. WILLSON 2,547,741
REGISTER LOCKING MEANS
Filed Sept. 23, 1946 3 Sheets-Sheet 3
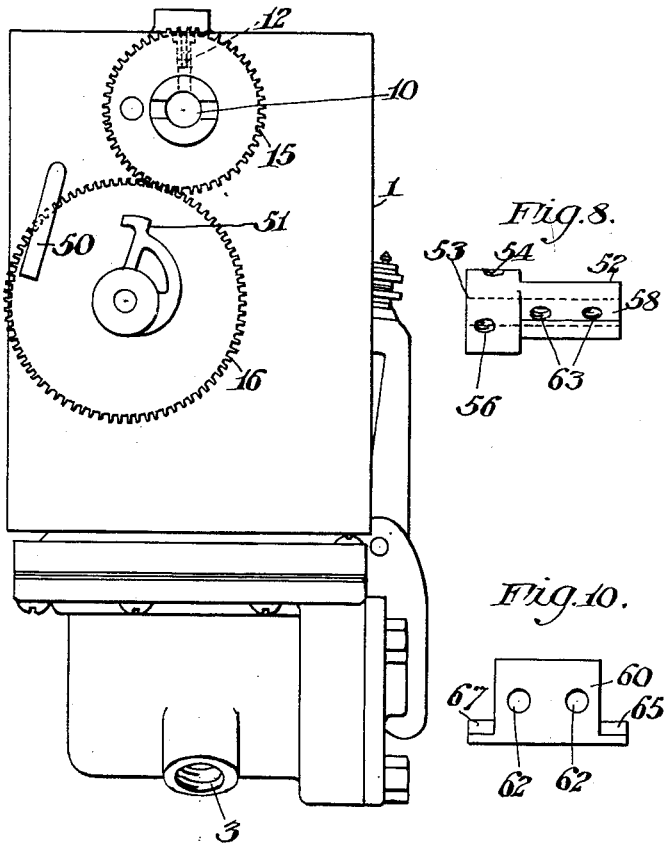
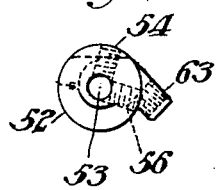
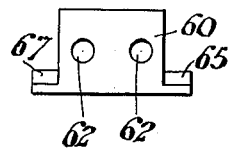
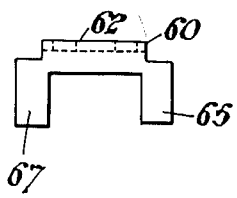
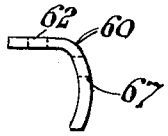
INVENTOR.
David S. Willson,
BY
Attorney.

Patented Apr. 3, 1951

2,547,741

UNITED STATES PATENT OFFICE 2,547,741

REGISTER LOCKING MEANS

David S. Willson, Muskegon Heights, Mich., assignor to John Wood Manufacturing Company, Inc., Philadelphia, Pa., a corporation of Delaware Application September 23, 1946, Serial No. 698,675

3 Claims. (Cl. 235—144)

My invention relates to means for locking the dial wheels of indicating mechanisms, and is particularly adaptable for use in tire inflator mechanisms to prevent adjustment of the range spring means below a predetermined value.

Unless the well known types of tens-transfer indicating mechanisms be provided with some form of compensating means, such as overthrow mechanism, it is almost impossible, from a practical standpoint, to assemble and adjust the mechanism to assure that the locking means will come into full play at the same time that the zeros on the dial wheels are centered and aligned in their window openings. In fact, it frequently occurs that the upper portions of the following figure 9's will appear in the window openings by the time the locking means has functioned fully.

Moreover, the prior art locking, or control, devices involve the adding of many parts, such as special cams, stop arms, crank pins, etc., to the indicating mechanism per se.

One object of my invention is to provide positive stop means which functions in a comparatively instantaneous manner to prevent any further motion of the range spring adjusting means.

Another object of my invention is to provide positive stop means which may be readily adjusted in assembling to function to prevent further motion of the range spring adjusting means at any point between zero and 9 pounds as indicated on the dial wheel of lowest order.

Another object of my invention is to provide stop means which may be embodied facilely in tens-transfer indicating mechanism.

Another object of my invention is to provide stop means in which the usual transfer discs of the number wheels are utilized as a part of the control means for effecting the stopping of rotation of the number wheels at a predetermined point.

Another object of my invention is to provide stop means which avoid undue strains and stresses on the parts of the mechanism.

My invention includes the various novel features of construction and arrangement hereinafter more definitely specified with reference to the accompanying drawings.

In said drawings;

Fig. 4 is a right-hand end elevation of the structure shown in Fig. 1.

Fig. 7 is a top plan view of the locking pawl bracket indicated in Fig. 1.

Fig. 8 is a front elevation of the locking pawl bracket shown in Fig. 7.

Fig. 9 is a left-hand side elevation of the locking pawl bracket shown in Fig. 8.

Fig. 10 is a top plan view of the locking pawl indicated in Fig. 1.

Fig. 11 is a front elevation of the locking pawl shown in Fig. 10.

Fig. 12 is a left-hand side elevation of the locking pawl shown in Fig. 11.

In Figs. 1 to 4, inclusive, I have shown my invention as embodied in a tire inflator mechanism of the type disclosed in the co-pending application of Joseph C. Woodford and myself for Improvement in Fluid Dispensing Apparatus, Serial No. 630,674, filed November 24, 1945. The inflating mechanism per se forms no part of my present invention and a detailed description of the parts and operation thereof is unnecessary for a full understanding of my present invention.

Referring to said drawings; the reference mark 1 indicates generally the outer casing of an inflator apparatus which is adaptable for charging an air receiver, such as an automobile tire, to a predetermined pressure. The inflator apparatus indicated is of the type which operates over a wide range of pressure adjustments, and operates in controlled cycles of pulsating charges of air to the receiver, each charge of air being terminated at a short interval after it is initiated. It is ordinary practice in service stations to highly compress air, say from 100 to 150 pounds per square inch, by a compressor operated by an electric motor, and to store such highly compressed air in a supply tank from which it may be released through tire inflating apparatus which is adjustable to predetermine the pressure to which the tire is to be inflated.

Figure 2:
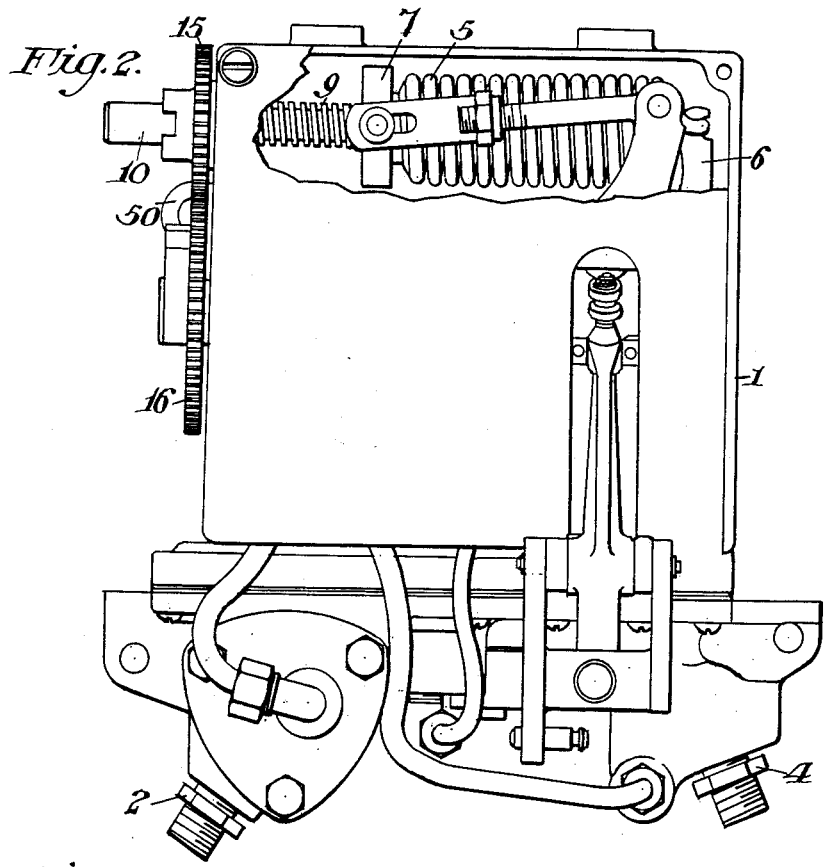
Fig. 2 is a rear elevation of the structure shown in Fig. 1, and with a portion of the cover plate broken away to show the range spring means, etc.

A supply source of air under high pressure is connected by suitable piping to the inlet fitting 2, which is in screw threaded relationship in the inlet opening 3; and a dispensing hose, provided with an air chuck of the well known type at the distal end thereof, is connected to the outlet fitting 4 of the tire inflator apparatus. Such inflator apparatus includes a main range spring 5, the right-hand end of which, as shown in Fig. 2, encircles and engages the upper end of the main control lever 6 of the apparatus.

The left-hand end of the spring 5 carries the nut 7 which is in screw threaded engagement with the adjusting screw 9 which, conveniently, is cut on the shaft 10. The left-hand end of the shaft 10 extends exteriorly to the casing 1, and is adapted to be provided with a crank handle (not shown) by which said spring 5 may be adjusted. The stresses of said spring 5 may be increased by turning said shaft clockwise, as in Fig. 4, or decreased by turning said shaft counterclockwise. The shaft 10 conveniently is journalled in a bearing which is press fitted in an opening formed in the side wall of the casing 1. The shaft 10 is prevented from axial displacement by any convenient means, such as spring pin means as indicated at 12 in Fig. 4.

Figure 1:
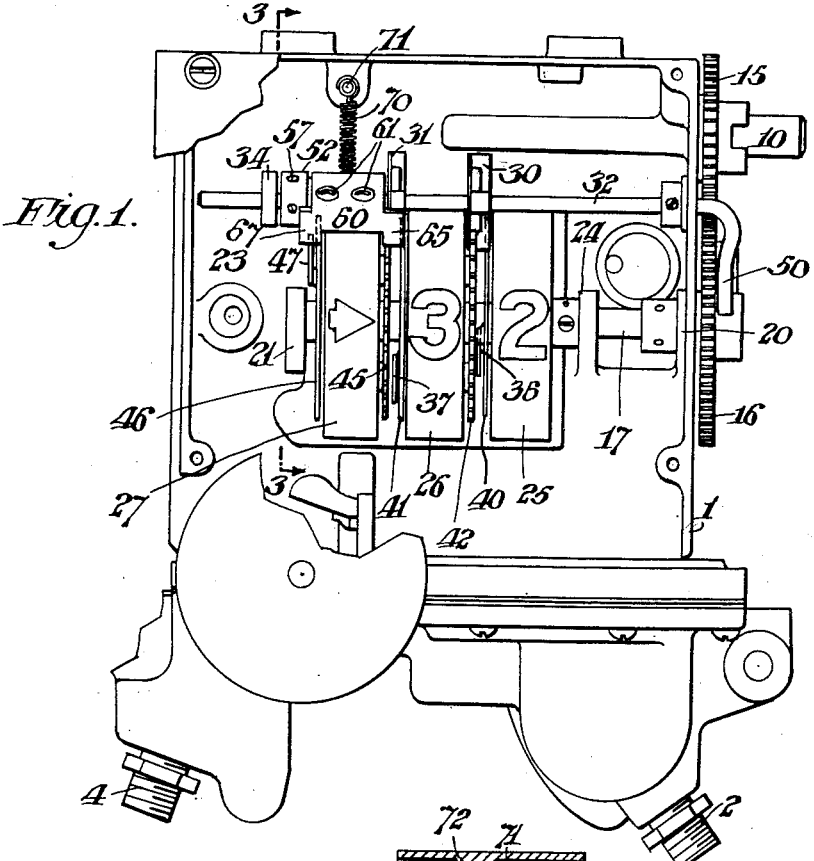
Fig. 1 is an elevation of a tire inflator mechanism embodying my invention, and with the outer dial face plate broken away.

The shaft 10 is connected with indicating means for manifesting in pounds the pressure to which a tire will be inflated in accordance with the adjustment of the spring 5 at the time of inflation. Such indicating means include the gear 15, rigidly fixed on the shaft 10, and said gear 15 is in mesh with the gear 16 which is rigidly mounted on the number wheel countershaft 17. As shown in Fig. 1, the right-hand end of the shaft 17 is journalled in a bearing 20 formed in the wall of the casing 1, and the left-hand end of said shaft 17 is journalled in the bearing 21 which, conveniently, is formed as a lug on the partition wall 23 of the casing 1. Said shaft 17, intermediate of its ends, is journalled in a bearing 24, also conveniently formed as a lug on the wall 23 of the casing 1.

The shaft 17 has connected therewith the number wheel 25 which has on its circumference a series of numbers from 1 to 9 inclusive and zero. Said number wheel 25, which indicates individual pounds, is connected by tens-transfer gearing with the similarly numbered wheel 26, and each of the numbers on said wheel 26 represents 10 pounds Said intermediate number wheel 26 is connected with the number wheel 27, the numbers on which represent 100 pounds. However, as the form of tire inflator mechanism shown is used mostly for inflating tires within a range below 99 pounds, I have found it convenient to substitute an arrowhead in the location on the number wheel 27 where the zero normally would appear. For convenience, I have omitted the showing of any of the numbers which appear upon the peripheries of the wheels 25, 26 and 27 except the number "2" on the wheel 25, the number "3" on the wheel 26, and the arrowhead on the wheel 27.

The connection between the number wheels is conveniently effected by the well known tens-transfer gearing and includes respective transfer pinions 30 and 31 which are loosely journalled on the rock shaft 32. As shown in Fig. 1; the rock shaft 32 near its right-hand end is mounted in a bearing in the side wall of the casing 1, and the left-hand end of said shaft 32 is mounted in the bracket 34.

Figure 5:
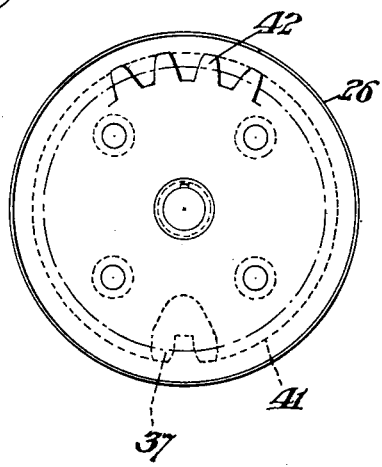
Fig. 5 is a right-hand elevation of the middle number wheel shown in Fig. 1.
Figure 6:
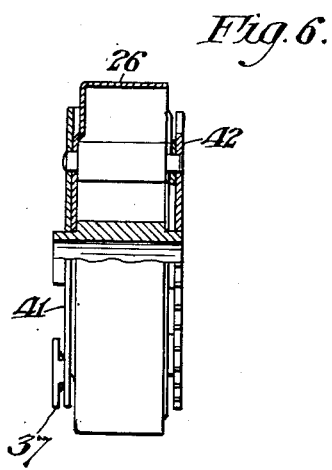
Fig. 6 is a vertical sectional view, partly in elevation, of the number wheel shown in Fig. 5.

When the number wheels are rotated, said pinions 30 and 31 are turned intermittently by their respective segment gears 36 and 37, in the well known manner, when the two teeth of a segment gear become engaged with the long teeth of its pinion. Said segment gears 36 and 37 are carried by, and offset from, their respective transfer disc members 40 and 41 which are fixed, respectively, on the wheels 25 and 26 in the usual manner. The pinion 30 is in continuous engagement with the gear 42 which is rigidly mounted on and carried by the number wheel 26, in the customary manner, as is best shown in Figs. 5 and 6. For convenience and clarity, only a portion of the teeth of the gear 42 is shown in Fig. 5. Movement of the pinion 30, by its segment gear 36 coming into engagement therewith, causes the pinion 30 to turn the gear 42 to effect turning movement of the number wheel 26 one-tenth of a revolution. The number wheel 27 is correspondingly provided with a gear 45 which is in continuous engagement with its pinion gear 31, and movement of the pinion gear 31 by its segment gear 37 causes the wheel 27 to be turned one-tenth of a revolution.

Figure 3:
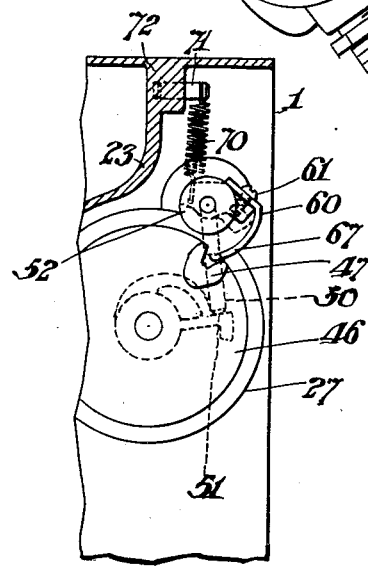
Fig. 3 is a fragmentary vertical sectional view, taken on the line 3—3 in Fig. 1.

The wheel 27 is also provided at its left-hand side, as shown in Figs. 1 and 3, with a sensing disc member 46, similar to the transfer discs 40 and 41, and said sensing disc 46 has the segment gear 47 offset therefrom in the same manner as has been previously described in connection with the similar segment gears 36 and 37.

As best shown in Figs. 1 and 4, the right-hand end of the shaft 32 is curved downwardly to form a locking member 50 which is adapted to engage the abutment 51 rigidly formed on the gear 16. The locking member 50 is adapted to be moved into locking position in the path of travel of the abutment 51 by counter-clockwise movement of the shaft 32, as hereinafter described. When the locking member 50 is in locking position, as shown in dotted lines in Fig. 3, further movement of the dial wheels 25, 26 and 27 toward the zero point is prevented by the abutment 51 coming into engagement with the locking member 50.

The sensing element bracket 52 is provided with the longitudinal opening 53 therethru for mounting the bracket 52 on the shaft 32. Said bracket is provided with screw threaded openings 54 and 56 for the set screws 57 by which the bracket 52 is rigidly fixed on the rock shaft 32.

Said bracket 52 is provided with the flattened arm portion 58 on which the sensing element 60 is rigidly mounted, conveniently by screws 61 which extend through openings 62 formed in the sensing element 60 into screw threaded engagement in the screw threaded openings 63 formed in the sensing element bracket 52. Said sensing element 60 is provided with the spaced apart ears 65 and 67 which are adapted to be moved clockwise, as in Fig. 3, into the respective recesses between the teeth on the segment gears 37 and 47 (and the corresponding notches formed in the transfer discs 41 and 46), when said recesses in said segment gears are presented in alignment beneath said ears 65 and 67, in the manner hereinafter described.

Such movement of the ears 65 and 67 permits the rock shaft 32 to move counter-clockwise, as in Fig. 4, to present the locking member 50, formed at the end thereof, in the path of travel of the abutment 51 on the gear 16. When the segment gears 37 and 47 are not so presented in alignment, the sensing element 60 (and rock shaft 32) is prevented from such a movement by either or both of the ears 65 and 67 of the sensing element 60 riding on the peripheries of the respective transfer discs 41 and 46.

The bracket 52 and the sensing element 60 carried thereby are continually stressed in a clockwise direction, as shown in Fig. 3, by the spring 70, the lower end of which is fastened in an opening formed in the bracket 52. The upper end of the spring 70 encircles and engages the stud 71 which is rigidly fastened in the boss 72 formed on the partition wall 23 of the casing 1.

Operation of locking means

Assuming that the mechanism has been set at 32 pounds, as indicated in Fig. 1; the stop means for the dial indicating mechanism will be ineffective at such setting because the locking member 50 is maintained out of the path of travel of the abutment 51 because the ear 65 of the sensing element 60 is riding on the periphery of the transfer disc 41 fixed on the intermediate wheel 26. When the number "3" of the intermediate wheel 26 is presented in the dial, the segment gear 37 on the transfer disc 41 has been so turned that it is not positioned beneath the ear 65. It is to be noted that with the wheel 27 of highest order at zero (arrowhead) indicating position, the notch in the segment gear 47 of the sensing disc 46 carried by said wheel 27 is in position to receive the ear 67 of the sensing element 60, and counter-clockwise movement of the sensing element 60 would occur if the sensing element 60 were not held in uplifted position by reason of its other ear 65 riding on the periphery of the transfer disc 41.

When the number dial wheels are brought down to an indication of 10 pounds, the intermediate wheel 26 is ready to move to the next lower digit, or zero. At an indication of 9 pounds on the wheel 25 of lowest order, the intermediate wheel 26 turns to zero, and the recesses in the segment gear 37 and its transfer disc 41 are positioned beneath the ear 65 of the sensing element 60, and in alignment with the recess in the segment gear 47 which has been previously positioned beneath the ear 67. Accordingly, the rock shaft 32 is free to move counter-clockwise, as in Fig. 4, to present the locking member 50 in the path of travel of abutment 51 carried by the gear 16.

It is to be noted that the ear 65 of the sensing element 60 is maintained in raised position from 10 pounds up to and including 99 pounds dial indication by the ear 65 riding on the periphery of the transfer disc 41. At the point at which the dial wheels turn to an indication of 100 pounds, the segment gear 47 has moved away from beneath the locking ear 67, and the sensing element 60 is then maintained in raised position by the ear 67 riding on the periphery of the disc 46 attached to the wheel 27 of highest order, although the recess in the segment gear 37 and transfer disc 41 of the intermediate wheel 26 would then be presented beneath the ear 65. At a dial indication of, say, 112 pounds, both the ear 67 and the ear 65 would be riding on the peripheries of their respective sensing disc member 46 and transfer disc 41.

It is to be noted that an adjustment may be made between the hub of the number wheel 25 and its drive shaft 17 so that the abutment 51 will come into engagement with the locking member 50 to finally lock out the device at any point between zero and 9 pounds as indicated on the wheel 25 of lowest order. In view of the fact that the type of mechanism indicated in Fig. 1 would never be used to inflate below 5 pounds pressure, it probably would be preferable to adjust the mechanism, as aforesaid, so that the mechanism will lock out finally at a 5 pound dial reading.

Such a form of lock out device is highly advantageous because it will permit leeway in the adjustment of the lock out position, which is not possible with prior art structures which always lock out below the true zero reading, and in some instances sufficiently below the zero reading to present about three-quarters of the next digit below the zero.

It is obvious that various modifications may be made in my invention without departing from the essential features thereof and, therefore, I do not desire to limit myself to the precise details of construction and arrangement as herein set forth.

I claim:

1. In a control device of the class described; a reversible rotatable main shaft; driving means for said rotatable main shaft; a series of indicating dial wheels on said main shaft, with the indicating dial wheel of lowest order rigidly connected to the main shaft; a transfer assembly including a notched disc and a segment gear carried by each of said dial wheels and rotatable therewith; a rock shaft; a sensing element rigidly fixed on said rock shaft, said sensing element being resiliently urged toward the periphery of the notched discs, said sensing element cooperating with a plurality of higher order discs and being adapted to enter the notched portions and the interdental space in said segment gears in the zero position thereof; stop means connected to said rock shaft and controlled by said sensing element; and an abutment operatively connected to said main shaft and adapted to engage said stop means when said sensing element has entered the notched portions and the interdental space in said segment gears on the higher order transfer discs.

2. In a control device of the class described; a reversible rotatable main shaft; driving means for said main shaft, a series of indicating dial wheels on said main shaft, with the dial wheel of lowest order rigidly connected to said main shaft; a transfer assembly including a notched disc and a segment gear carried by each of said dial wheels and rotatable therewith; a rock shaft; a sensing element rigidly fixed on said rock shaft, said sensing element being resiliently urged toward the periphery of the notched discs, said sensing element cooperating with a plurality of higher order transfer discs and being adapted to enter the notched portions and the interdental space in said segment gears in the zero position thereof; stop means connected to said rock shaft and controlled by said sensing element; and an abutment operatively connected to said driving means for the main shaft and adapted to engage said stop means when said sensing element has entered the notched portions and the interdental space in said segment gears on the higher order transfer discs.

3. A control device as claimed in claim 1 wherein said sensing element is provided with spaced ears adapted to enter the notched portions and the interdental space in said segment gears in the zero position of said discs.

DAVID S. WILLSON.

REFERENCES CITED

The following references are of record in the file of this patent:

UNITED STATES PATENTS

| Number | Name | Date |
| --- | --- | --- |
| 579,115 | Little | Mar. 16, 1897 |
| 2,102,046 | Tyler | Dec. 14, 1937 |
| 2,371,070 | Sager et al. | Mar. 6, 1945 |